Patented June 12, 1923.

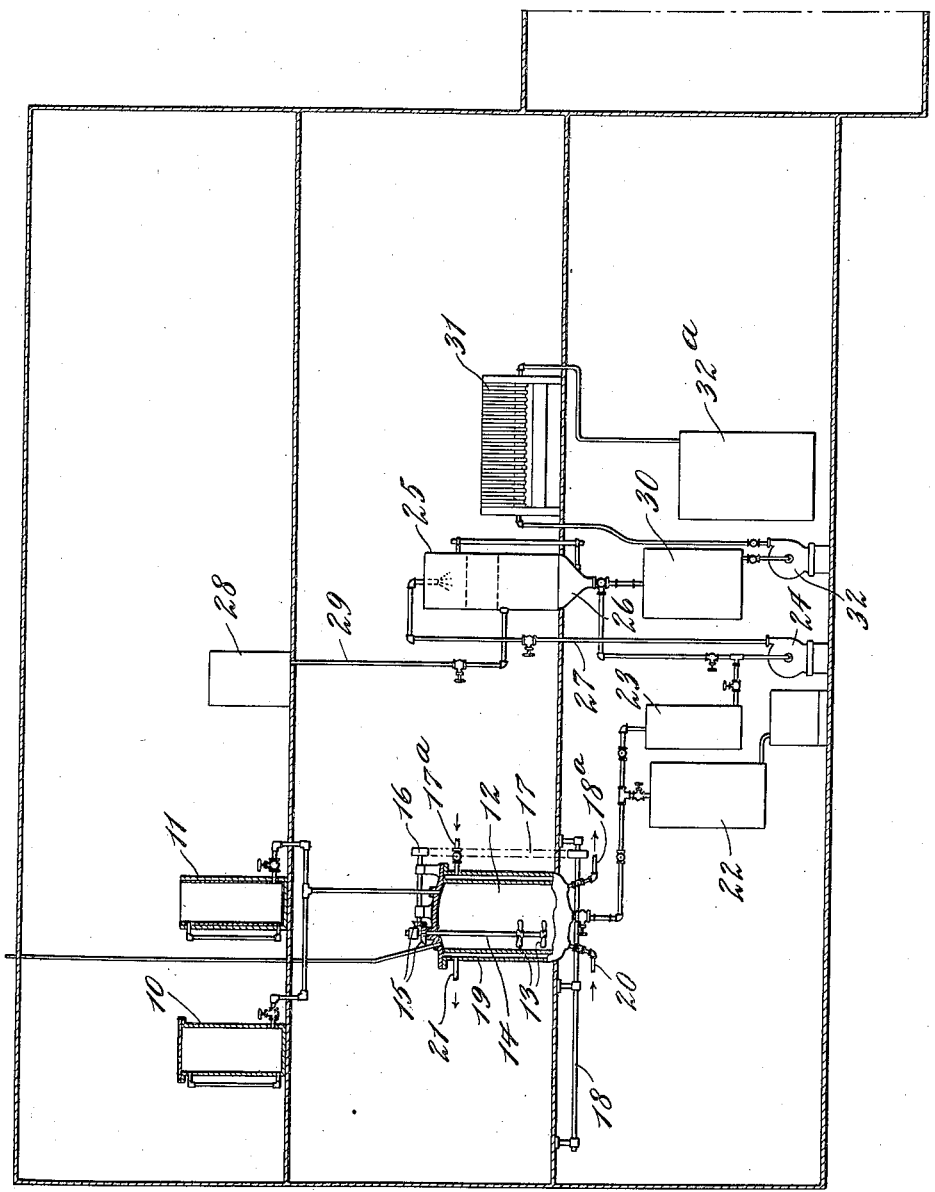

1,458,491

UNITED STATES PATENT OFFICE.

RALPH H. McKEE, OF NEW YORK, AND HERMON C. COOPER, OF WHITE PLAINS, NEW YORK; SAID COOPER ASSIGNOR TO SAID McKEE.

METHOD OF MAKING OXIDIZED AROMATIC SUBSTANCES.

Application filed November 12, 1919. Serial No. 337,558.

*To all whom it may concern:*

Be it known that we, RALPH H. McKEE and HERMON C. COOPER, citizens of the United States, residing at New York, in the county of New York, borough of Manhattan, and State of New York, and White Plains, in the county of Westchester and State of New York, respectively, have invented certain new and useful Improvements in a Method of Making Oxidized Aromatic Substances, of which the following is a specification.

The common process of making benzoic acid in this country consists in treating toluene with chlorine, and heating the resultant mixture with milk of lime or a mixture of milk of lime and hypochlorite. The filtrate from the resultant mixture is then treated with muriatic acid, and thereby the benzoic acid is precipitated from the solution. The resultant benzoic acid, which is dried and sublimed, carries a small amount of chlor-benzoic acid as an impurity, which is objectionable for most uses, particularly in medicine and as a food preservative, principally owing to its odor.

In accordance with our invention, benzoic acid may be prepared more expeditiously and economically, and with better yield, and free from the unpleasant odor due to the chlorine which is ordinarily present in benzoic acid, by bringing toluene in excess into contact with chromic acid.

Our invention also relates to the manufacture of benzoates, and particularly benzoate of soda, from a toluene solution of benzoic acid.

Our invention also relates to the production and purification of benzoates from a benzoic acid solution in toluene by bringing the solution into contact with a solution of an alkali in excess.

Other objects of the invention will appear in the specification, and will be particularly pointed out in the claims.

The accompanying drawing illustrates diagrammatically an apparatus adapted to carry out our process, which may most conveniently be described in connection with the drawing. We will describe the manufacture of benzoic acid and benzoate of soda therefrom, it being understood that other materials, such as nitro-benzoic acid may also be prepared in accordance with our invention, as will later appear.

Toluene is conveyed from the reservoir 10, and a chromic acid mixture, which, in the process, is used for furnishing chromic acid, which, in turn, is used to oxidize the toluene to benzoic acid, from the reservoir 11 into the mixing kettle 12. The chromic acid mixture preferably consists of one part by weight of sodium bi-chromate, six parts water and six parts sulphuric acid of 66° Bé., although it will be understood that these proportions are subject to considerable variation without any decided influence on the process, and without departing from the spirit of our invention. One volume of toluene to about seven or eight volumes of the chromic acid mixture is added to the kettle, the amount of toluene being in excess of the amount that is theoretically necessary in the production of benzoic acid. The mixture is then thoroughly agitated, in the form of apparatus here illustrated, by paddles 13 which are submerged in the mixture, the paddles being secured to a shaft 14, which is driven through bevel gears 15, pulley 16, belt 17 and a driven shaft 18. This treatment is preferably carried out at a temperature of approximately 85° C., first by admitting steam by pipes 17$^a$ and 18$^a$ to a jacket 19 surrounding the kettle, and after the reaction has started, by running water through the same jacket through pipes 20 and 21 in sufficient amount to carry off the heat liberated because of the reaction, and thereby maintaining the temperature of the mixture at the desired temperature. The toluene, which is used in excess in accordance with our invention, dissolves the benzoic acid as it is formed, and thereby prevents it from reacting with further quantities of chromic acid and carrying the oxidation process too far, in which case a considerable part of the benzoic acid would be converted into water and carbonic acid gas. The mixing kettle is lined with lead, enamel or cement, and it may be heated and cooled by the outer jacket, as in the manner described, or by coils of pipe within the kettle in a well known manner.

The treatment is preferably continued until the initial chromic acid has largely been reduced, for example, to the extent of 85 per cent to chromic sulphate.

The contents of the kettle are then allowed to stand until the separation into layers of the toluene solution of benzoic acid, and the chromic sulphate-sulphuric acid mixture, is completed. The contents of the kettle are then run off into two tanks, the chromic sulphate-sulphuric acid mixture into a tank 22, and the toluene solution of benzoic acid into a tank 23. The chromic sulphate-sulphuric acid mixture is then regenerated, preferably electrolytically, in accordance with the process described in an application, Serial No. 321,609, which was filed in the Patent Office by said Ralph H. McKee, on or about September 4, 1919.

The toluene solution of benzoic acid is next treated with a suitable alkali to form a benzoate, preferably with sodium carbonate solution when sodium benzoate is to be produced. Under some conditions, however, it may be desirable first to wash the toluene benzoic acid solution with water (or a solution with a small amount of sodium carbonate) to remove any of the sulphuric acid mixture which might have been mechanically carried over by the toluene, and when this washing process is desirable, it may be carried out with the same apparatus that is used to convert the benzoic acid to sodium benzoate, which will now be described. The toluene solution is forced by a pump 24 into a tank 25 provided with a conical bottom, as at 26. Water is then introduced into the tank 25, in any desired manner, and the washing is accomplished, for example, as by stirring the two solutions together, or, better still, pumping the water from the bottom of the tank 25 through the pipe 27 to the top of the toluene solution. The solution containing the sulphuric acid (or sodium sulphate) is then drawn off from the tank 25 and the toluene solution is ready for treatment with the alkaline solution which is to form with the benzoic acid the desired benzoate. The resultant water solution is preserved and later may be worked up for any benzoic acid it contains. In case great care is used in the operation of the process, so that the amount of the sulphuric acid mixture passing over with the toluene solution is inappreciable, then the washing process may be entirely omitted without detriment to the process. However, as a matter of safety, we prefer to carry out this washing step in working the process. When it is desired to prepare sodium benzoate from the benzoic acid, the toluene solution is treated with an alkaline sodium salt, such as sodium carbonate, sodium bi-carbonate, or sodium hydroxide, but preferably with sodium carbonate. The sodium carbonate solution is contained in a reservoir 28, from which it is conveyed to the tank 25 by a valved pipe 29, and slightly in excess of the amount required to convert the benzoic acid into benzoate of soda, so that the resultant mixture is slightly alkaline. The sodium carbonate solution may be thoroughly mixed with the toluene solution by pumping the same over and over again into the tank 25 by means of the pump 24, in the same manner as described in connection with the washing treatment, or the sodium carbonate solution may otherwise be thoroughly mixed with the toluene solution, thereby forming sodium benzoate. The toluene is then allowed to separate from the benzoate solution, and is again used, being conveyed to the toluene reservoir by suitable piping connections (not shown). The sodium benzoate solution so formed is then drawn off into a storage tank 30. Since the solution is alkaline, the same may be passed through an ordinary filter-press of wood or iron, which we have indicated at 31, the same being forced therethrough by a pump 32, the alkaline solution serving to precipitate out any chromium which may be carried over from the oxidizing process, or any iron or lead from the apparatus, and they will be removed, together with any suspended material, such as dirt, in the filter-press. From the filter-press the material is passed into a storage tank 32ᵃ.

After passing the filter-press, the solution is slightly alkaline, because of an excess of sodium bi-carbonate (the excess of sodium carbonate which was added at a previous step in the process having been changed to sodium bi-carbonate by the carbon dioxide set free by the benzoic acid).

The clear sodium benzoate solution carrying a small amount of sodium bi-carbonate is next exactly neutralized by the addition of benzoic acid (which may be made in another part of the plant).

The resulting sodium benzoate solution is then evaporated in a known manner to a solid, then dried, and ground.

It will be understood that in the alkaline treatment, in place of the sodium carbonate, sodium bi-carbonate or sodium hydroxide mentioned, other alkaline equivalent materials may be used, such, for example, as lithium carbonate, calcium hydroxide, etc.

In the process of preparing benzoic acid from benzoates it will be understood that benzoic acid derivatives and corresponding benzoates may be prepared from the corresponding derivatives of aromatic substances having alkyl side chains, preferably from toluene. For example, nitro-toluene may be used instead of the toluene, and, in accordance with the same process, nitro-benzoic acid and nitro-benzoates will be produced.

From other aromatic substances corresponding acids and aldehydes can be made in a similar manner.

When we refer in the claims, therefore, to the preparation of benzoic acid, it is to be understood that we intend to cover aromatic derivatives, which are prepared in accordance with the described process.

While it has hitherto been proposed to oxidize toluene to benzoic acid by stirring, at about 30°, toluene with a water solution of chromic acid, such treatment has not been carried out, so far as we are aware, by using toluene in excess. With the processes previously used, the temperature is limited to about 30° or 40° C., since any attempt to carry out the process at a higher temperature results in a considerable part of the benzoic acid formed being converted into water and carbonic acid gas. In accordance with our process, where an excess of the toluene is used, the process is carried out in a fourth or a fifth of the time that would be required at the lower temperature. In the new process, we are able to obtain about 90 per cent of the quantity of the benzoic acid that it is theoretically possible to obtain, which is much in excess of that produced by the hitherto known method.

Furthermore, in accordance with our invention, it is unnecessary in making a benzoate, such as sodium benzoate, to isolate the benzoic acid, as has hitherto been the practice, since the toluene benzoic acid solution is treated directly with the alkali to produce the desired benzoate.

What we claim and desire to secure by Letters Patent of the United States is:—

1. The process of making an oxidized aromatic acid which consists in treating a liquid aromatic substance having an alkyl side chain and in excess with chromic acid in the form of a liquid.

2. The process of making an oxidized aromatic acid which consists in treating a liquid aromatic substance having an alkyl side chain and in excess with chromic acid, and under conditions whereby said oxidized substance so formed is dissolved in the said excess liquid aromatic substance.

3. The process of making an oxidized aromatic acid which consists in treating a liquid aromatic substance having an alkyl side chain and in excess with chromic acid, and under conditions whereby said oxidized substance so formed is dissolved in the said excess liquid aromatic substance, said treatment being accompanied by agitation at a temperature approximately 85° C.

4. The process of making benzoic acid which consists in mixing liquid chromic acid with toluene in excess and under conditions causing the benzoic acid so formed to be dissolved in the excess toluol.

5. The process of making benzoic acid which consists in mixing liquid chromic acid with toluene in excess and under conditions causing the benzoic acid so formed to be dissolved in the excess toluol, and treating the solution so formed with alkali to separate the benzoic acid from said solution.

6. The process of making benzoic acid which consists in treating toluene in liquid form with a mixture of chromic acid, water and sulphuric acid, the toluene treated being in excess of its combining proportion with the chromic acid of said mixture.

RALPH H. McKEE.
HERMON C. COOPER.